United States Patent [19]

Dyball

[11] 4,099,552
[45] Jul. 11, 1978

[54] ATTACHMENT FOR A POWER TOOL

[76] Inventor: Reginald Gordon Dyball, 34 Fitzroy St., St. Kilda, Victoria, Australia, 3182

[21] Appl. No.: 733,888

[22] Filed: Oct. 19, 1976

[30] Foreign Application Priority Data

Oct. 24, 1975 [AU] Australia ............................ 3711/75

[51] Int. Cl.² .............................................. B27C 5/10
[52] U.S. Cl. ................................... 144/134 D; 33/42; 144/1 F
[58] Field of Search .......................... 90/11 R; 33/42; 144/1 E, 1 F, 134 D, 136 D

[56] References Cited

U.S. PATENT DOCUMENTS

| 1,792,393 | 2/1931 | Phillips | 33/42 |
| 3,087,520 | 4/1963 | Fielder | 144/136 C |
| 3,853,160 | 12/1974 | Posey | 144/136 C |
| 3,893,372 | 8/1975 | Strakeljahn | 144/136 C |

FOREIGN PATENT DOCUMENTS 1,223,524  8/1966  Fed. Rep. of Germany ... 144/134 D

Primary Examiner—Othell M. Simpson
Assistant Examiner—W. D. Bray
Attorney, Agent, or Firm—Shlesinger, Arkwright, Garvey & Dinsmore

[57] ABSTRACT

An attachment for a power tool adapted to perform materials working or shaping operations by means of a rotatable working or shaping element thereof. The attachment has a base member adapted to be secured to the housing of the tool, adjacent the shaping element; at least one arm mounted on the base member and projecting therefrom; and a guide member mounted on the arm and movable relative to the base member to provide a variable guide which, in use of the attachment on a power tool, engages a surface of material to be worked or shaped and guides the shaping element of the tool in relation to that material.

10 Claims, 8 Drawing Figures

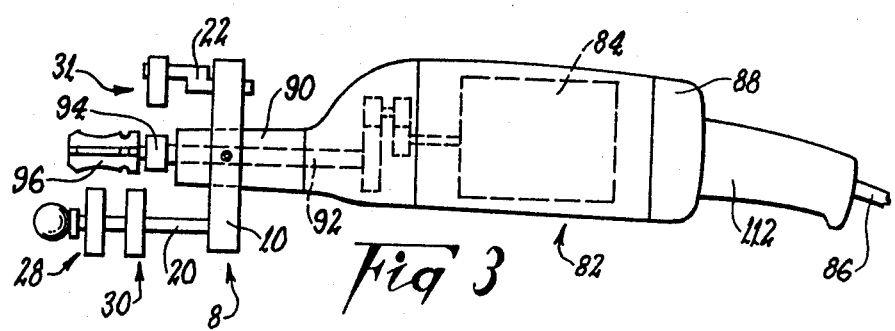
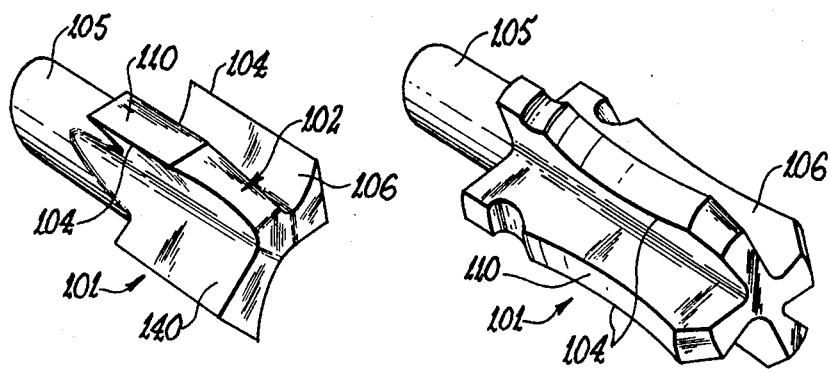
Fig 4a   Fig 5a
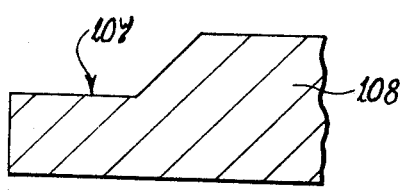 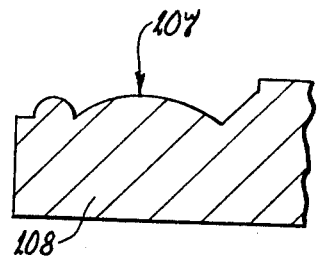
Fig 4b   Fig 5b

ATTACHMENT FOR A POWER TOOL

This invention relates to an attachment for a power tool and, in particular, to an attachment facilitating material working or shaping operations, such as woodworking moulding and/or forming operations.

Wood moulding and forming operations, such as used in forming edgings or the like, for example on or around articles of furniture, frequently are performed manually by skilled craftsmen. The operations are time consuming and, consequently, limit production output and increase the cost of production.

The present invention seeks to provide an attachment for a power tool, for example, a high speed electrical or air operated power tool, which facilitates certain materials working or shaping operations, such as woodworking moulding and/or forming operations. The invention, accordingly, provides an attachment for a power tool adapted to perform materials working or shaping operations by means of a rotatable working or shaping element thereof, the attachment having a base member adapted to be secured to the housing of the tool, adjacent the shaping element, at least one arm mounted on the base member and projecting therefrom, and a guide member mounted on the arm and movable relative to the base member to provide a variable guide adapted, in use of the attachment on a power tool, to engage a surface of material to be worked or shaped and guide the shaping element of the tool in relation to that material.

The attachment may be adapted for use with a hand-held, high speed power tool of the type referred to as die grinders. The attachment may be used with a die grinder with a conventional grinding, cutting or buffing element, such as where a tool is used to work excess material, such as a weld bead, of a metal article. In such application, the attachment of the present invention may be used to guide the tool along a zone to be worked, and permits adjustment of the shaping element in relation to that zone.

Alternatively, the tool may be fitted with, for example, a fluted cutting element suitable for material moulding and/or forming operations, such as to be performed for carving timber of providing a decorative moulded edging on a timber article.

The base member may be a plate having an aperture shaped to receive the housing of the tool therein, such that the shaping element of the tool projects axially from a major surface of the plate. The plate may be of annular form, for example, substantially circular or eliptical. Locking means may be provided on the base member for releasably securing it to the tool.

The or each arm may project from the base member, such as from a major surface thereof, so as to extend substantially parallel to the axis of rotation of the shaping element when the attachment is fitted to a power tool. The or each arm may be fixed to the base member, or adjustably mounted thereon so as to be longitudinally adjustable in relation to the axis of rotation of the shaping element. In one form of the attachment, a pair of arms are provided, these being located in diametrically opposed relation with respect to the aperture of the base member and the axis of rotation of the shaping element.

The guide member of the or each arm may include a body portion mounted on the arm and movable therewith and/or relative thereto. The guide member also may include support means, on which a roller for engaging a surface of the material to be worked or formed is mounted; the support means preferably being adjustable relative to the body portion, for example, laterally of the arm.

In one form, the body portion may be a boss or collar located on the arm. The boss or collar may be provided with an extension on which a carriage is mounted for movement relative to the arm, for example, laterally thereof. An adjustment screw may be provided on the boss or collar or on the carriage for adjustment of the position of the carriage relative to the arm. Moreover, the roller means may be located on the carriage and adjustable relative to the arm by movement of the carriage.

In the form of the attachment in which two arms are provided, the roller support means or carriage of the guide member of each arm may be positioned to engage a respective one of a pair of adjacent surfaces of the material to be worked or formed. Alternatively, the roller means of each guide member may be positioned to engage the one surface of the material, whether the surface be planar or curved.

In order that the invention may be more readily understood, description now will be directed to the accompanying drawings, in which:

FIG. 3 is a schematic representation of an attachment according to FIGS. 1 and 2 fitted to a power tool, and FIGS. 4A, 4B and 5A, 5B show respective wood shaping elements for use with the combination of FIG. 3. and the profile provided thereby.

Figure 1:
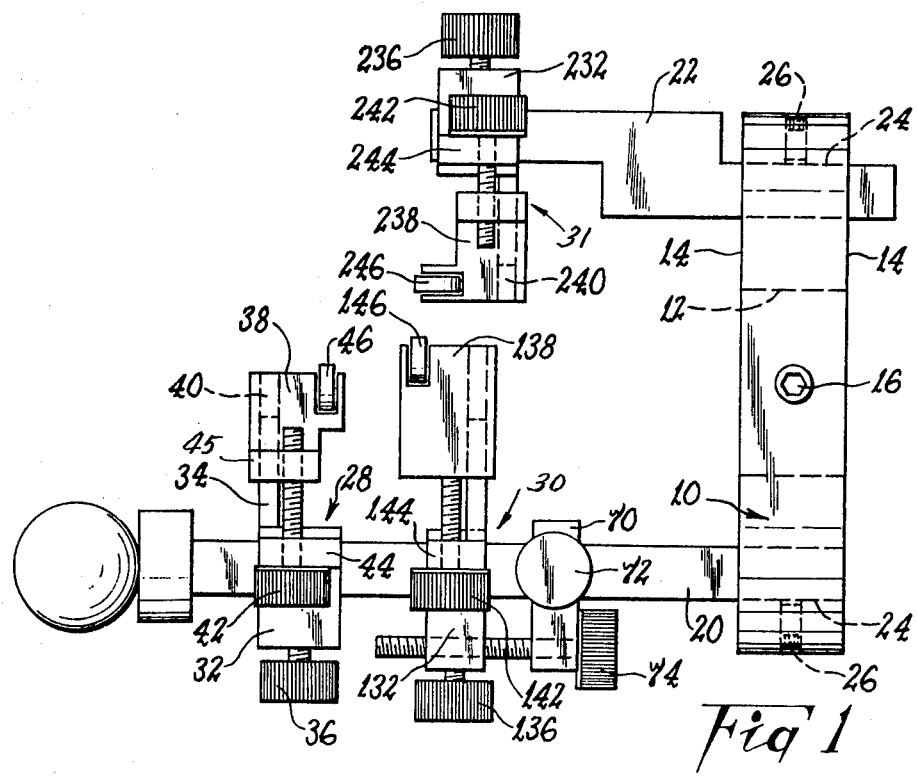
FIG. 1 is a side elevation of an attachment for a power tool.

The attachment 8 has a base member 10, here shown as being of oblate form. The member has a centrally disposed bore 12 extending between major surfaces 14 thereof, and securement screws 16 extending radially of the bore 12 so as to secure portion of the housing on a power tool (not shown) in that bore.

Projecting from one surface 14, is a pair of arms 20, 22 of square or rectangular cross-section. The arms are diametrically opposed with respect to bore 12 and are secured in bores 24 of corresponding section by screws 26, so as to be longitudinally adjustable.

Arm 20 carries guide members 28, 30. The member 28, which is nearer the end of arm 20 remote from base member 10, includes a boss 32 from which an extension arm 34 projects parallel to the surfaces 14 of base member 10. The boss is slidably along arm 20 but may be fixed in a desired position relative to the base member 10 by means of screw 36.

Guide member 28 also includes a carriage 38 slidable along extension arm 34 of the boss. For this purpose, the carriage is provided with an aperture 40 of rectangular cross-section in which the extension arm 34, also of rectangular cross-section, is received. Carriage 38 is positionable with respect to arm 20 by means of a micrometer screw 42, journalled in a lug 44 projecting laterally from boss 32 the screw also being threadably engaged in lug 45 of carriage 38 for adjusting the position of the latter relative to arm 20 and the axis of bore 12.

At the end of carriage 38 remote from arm 20, there is provided a roller 46. As shown, the roller is rotatable about an axis 48 parallel with arm 20.

Guide member 30 is similar to guide member 28, with corresponding parts being designated by the same reference numeral plus 100. However, as shown, boss 132 has a parallel pair of extension arms 134, each of which has a carriage 138 movable therealong under the action of a respective micrometer screw 142. Arms 134 are parallel to arm 34, such that their carriages are positionable over opposite sides of aperture 12.

Additionally, boss 132 has a projecting plate 150 lying intermediate extension arms 134. Each of carriages 138 has along its side adjacent plate 150 a channel, defined by flanges 152, in which marginal edge of plate 150 is located. By this arrangement, plate 150 and extension arm 134 facilitate smooth movement of carriages 138 relative to arm 20 and the axis of bore 12 during rotation of screws 142.

Intermediate boss 132 and base member 10, a further boss 70 is slidably mounted on arm 20. The boss 70 may be fixed in a required position on that arm by means of screw 72; while the position of boss 132 then can be adjusted (prior to tightening of screw 136) by means of micrometer screw 74 journalled in boss 70 and threadably engaging in boss 132.

Arm 22 which, as shown, has its end remote from base member 10 offset outwardly therefrom, carries a guide member 31. The latter is similar to member 28, with corresponding parts being designated by the same reference numeral plus 200. However, as shown, roller 246 is rotatable on an axis at right angle to the axes of rollers 46 and 146; that is, perpendicular to arm 22 and the axis of bore 12.

With reference to FIG. 3, the power tool 82 may be of a number of known forms, for example, a Metabo model 6139 or 6140 manufactured by Metabowerke KG of Germany, or an AEG G5330 manufactured by AEG-Telefunken, also of Germany. The tool most conveniently is a high performance, high power type rated, for example, at from 700 to 800 watts and operable at speeds of, for example, 18,000 to 32,000 r.p.m. As with each of the models designated, the tool may have an electric motor 84 powered, by a line 86, from any convenient source. However, motor 84 alternatively may be an air-operated type, in which case line 86 would be a compressed air line connectable to a source of compressed air.

As shown, the housing 88 of the tool has an elongate extension 90 through which a shaft 92, driven by motor 84, extends. The shaft 92 is rotatable in bearings (not shown) and has, at its outward end, a chuck or similar device 94 for receiving and rotatably driving cutting element 96.

The cutting element 96, as shown in the respective forms of FIG. 4A and 5A, may have a multi-fluted cutting head 102 having cutting edges 104 extending longitudinally of shaft 105. The edges 104 are under-cut such that faces 106 are non-radial with respect to shaft 105; the side profile of the edges being shaped in accordance with the patterning or moulding profile 107 to be applied to a work piece 108, as shown in respective FIGS. 4B and 5B. Trailing faces 110 are inclined slightly inwardly from a tangential plane through each cutting edge, to provide clearance during use of the cutting element.

Figure 2:
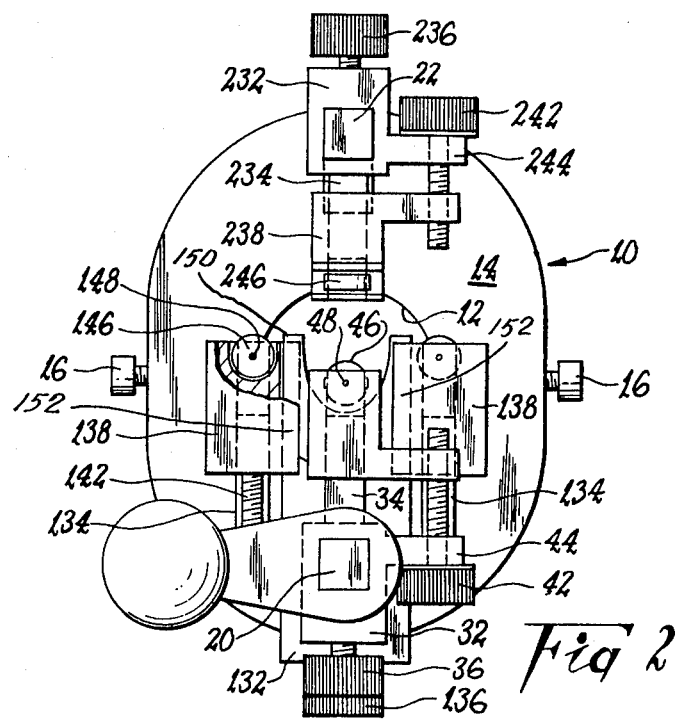
FIG. 2 is an end elevation, from the left-hand side of the attachment of FIG. 1.

In use, the attachment is mounted on the power tool housing. For this purpose, extension 90 of the housing is inserted through bore 12 so as to locate the axis of rotation of the shaping element of the tool along the axis of bore 12 and between the rollers of guide members 28, 30 and 31. For this purpose, it is necessary to retract each of carriages 38, 138 and 238 from the position shown in FIGS. 1 and 2 to positions nearer their respective boss; the carriages being shown in the positions indicated for clarity of illustration of the guide members.

Assuming, for example, that the shaping element is a wood cutter to be applied along the edges of an article of wood for the purpose of moulding or forming a decorative edge as in FIGS. 4B and 5B, carriages 38 and 138 are positioned relative to the axis of bore 12 (and hence to the wood cutter) such that the peripheries of rollers 46 and 146 remote from arm 20 lie in a common plane (if the edge is straight) or on an arc (if the edge is curved), and carriage 238 is positioned in relation to arm 22. In each instance, the positioning of the carriages will depend on the depth of cut to be effected by the wood cutter and the spacing of the cut from the edge. The wood cutter then is applied to the article so as to engage rollers 46 and 146 with one surface of the article defining the edge and to engage roller 246 with a or the adjacent surface of the article, and the tool then is moved along the article while stabilized in a fixed orientation with respect to the edge due to the influence of the guide means.

To assist in retaining the respective rollers in engagement with the article and, hence, the shaping element of the power tool in a fixed relation to the edge of the article, a handle 80 is provided on the end of arm 20 (or, alternatively, on arm 22 or the base member 10). Typically, the power tool also will be provided with a handle 112 and, by holding the latter and handle 80, an operator will be able to ensure complete stability for the tool and uniformity of the working and/or shaping of the article as the power tool is moved therealong, due to engagement of rollers 46 and 146 with one surface of the article to be worked and/or shaped and of roller 246 with an adjacent surface of the article.

While shown with two arms and associated guide means, the attachment could be used, such as in use with a power tool applied to a surface of an article, with a single arm; with the roller of the or each guide member of that arm engaging the surface along a line remote from edges of the article.

Figure 1A:
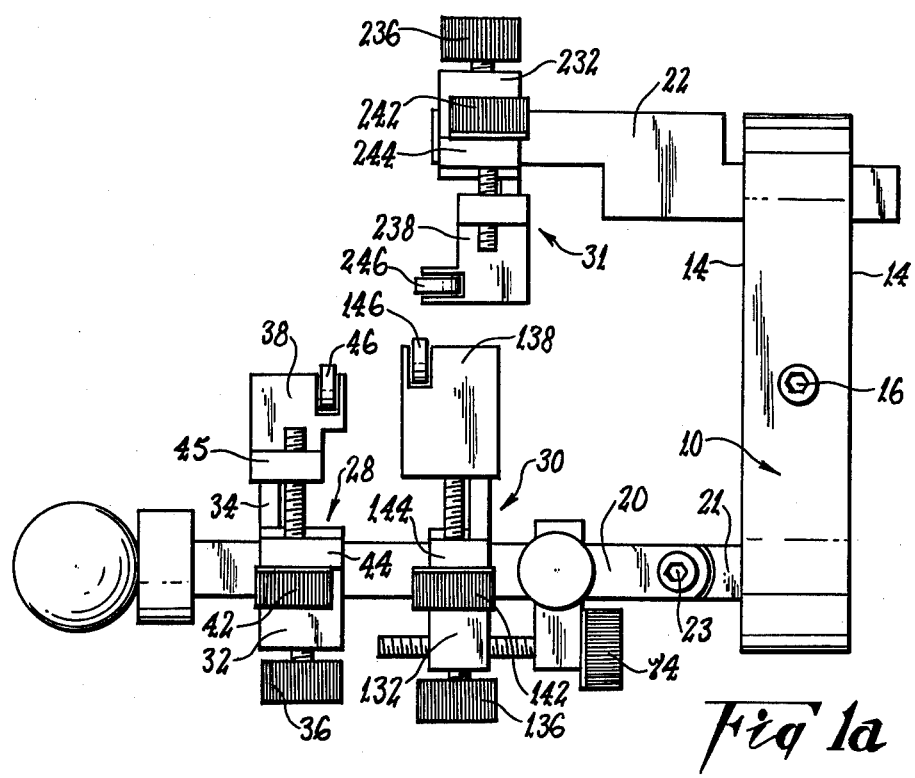
FIG. 1a is a side elevation of an alternate embodiment.

Moreover, it will be appreciated that, while the attachment illustrated is particularly suitable for use in working a right angled edge of an article, the attachment could be modified for use in working curved edges of other than right angled edges. Thus, for example, one or both of arms 20, 22 could be mounted so as to be adjustably pivotable on the base member 10 with respect to post 21 about bolt 23 as shown in FIG. 1a to permit variation of the axis on which roller 246 is rotatable with respect to rollers 46 and 146. Alternatively, one or each boss may be of a two-part configuration in which a part carrying extension arms 34, 134 and 234 is pivotable with respect to the respective one of arms 20 and 22 and a second part on that arm, to permit such relative variation of the inclination of the axis of roller 246.

Finally, it is to be understood that various alternations, modifications and/or additions may be introduced into the constructions and arrangements of parts previously described without departing from the spirit or ambit of the invention.

Having now described my invention, what I claim as new and desire to secure by Letters Patent is:

1. An attachment for a power tool adapted to perform materials working operations along an edge defined by mutually inclined adjacent surfaces on a workpiece by means of a rotatable shaping element thereof; said attachment having a base member and first and second arms mounted on said base member and projecting therefrom in mutually spaced relationship; a respective guide member mounted on each of said arms; said base member being adapted to be secured to the housing of the tool, adjacent the shaping element such that the shaping element is located intermediate said first and second arms; and each of said guide members being movable relative to the base member to provide a variable guide adapted, in use of the attachment on a power tool, to engage a respective one of said mutually inclined adjacent surfaces of the workpiece and to guide the shaping element of the in relation to the workpiece, each guide member including a body portion by which it is mounted on its respective arm and at least one support means on which is mounted a roller for engaging the respective surface of the material to be worked; the support means being adjustable relative to the body portion laterally of the arm.

2. An attachment according to claim 1, wherein the base member is a plate or collar having an aperture extending therethrough, between an opposed pair of major surfaces thereof, in which a portion of the tool housing may be received with said working or shaping element extending substantially axially of said aperture, and locking means for securing said housing portion in said aperture.

3. An attachment according to claim 2, wherein each of said arms projects from the base member, such as from a major surface thereof, so as to be extendable substantially parallel to the axis of said aperture and, hence, to the axis of rotation of the shaping element when the attachment is fitted to a power tool.

4. An attachment according to claim 3, wherein each of said arms is longitudinally adjustable relative to said base member.

5. An attachment according to claim 1, wherein one of said arms is provided with a pair of said guide members spaced longitudinally thereof.

6. An attachment according to claim 4, wherein one said arms is provided with a pair of said guide members spaced longitudinally thereof.

7. An attachment according to claim 5, wherein one of said pair of guide members has two roller support means mounted on a common body portion.

8. An attachment according to claim 6 wherein one of said pair of guide members includes two roller support means mounted on a common body portion.

9. An attachment according to claim 1, wherein each arm is mounted on said base member so as to be adjustably pivotable relative thereto to permit variation of the orientation of the guide means thereof.

10. An attachment according to claim 5, wherein each arm is mounted on said base member so as to be adjustably pivotable relative thereto to permit variation of the orientation of the guide means thereof.

* * * * *